United States Patent

Petersen

[15] 3,691,312

[45] Sept. 12, 1972

[54] TAPE RECORDING APPARATUS AND SYSTEM HAVING A VERY THIN CASSETTE

[72] Inventor: Christian C. Petersen, Westwood, Mass.

[73] Assignee: Polaroid Corporation, Cambridge, Mass.

[22] Filed: May 25, 1970

[21] Appl. No.: 40,898

[52] U.S. Cl. ................. 179/100.2 Z, 40/28.1, 95/12, 242/199, 274/4 C, 353/19

[51] Int. Cl. ......................... G11b 23/04, G11b 23/44

[58] Field of Search ....... 179/100.2 Z; 274/4 C, 11 C, 274/43, 42 K; 353/15, 19; 95/12, 31 CA; 40/28.1; 242/197, 198, 199, 200, 71.2; 352/26

[56] References Cited

UNITED STATES PATENTS 3,285,613 11/1966 Hallamore ................. 274/4 C 3,401,397 9/1968 Blakistone et al. .. 179/100.2 Z 2,951,914 9/1960 Dubois ................ 179/100.2 Z 2,547,186 4/1951 Walker ..................... 242/71.2

3,596,006 7/1971 Lawhon .............. 179/100.2 Z

*Primary Examiner*—Bernard Konick

*Assistant Examiner*—Jay P. Lucas

*Attorney*—Brown and Mikulka, William D. Roberson and Gerald L. Smith

[57] ABSTRACT

An audio-visual recording system featuring a magnetic tape cassette in combination with a surface for supporting one or two photographic prints. The tape cassette portion of the assembly is very thin, having a width approximating the sum of the widths of the supporting surface and two photographic prints. The cassette is configured having a length coextensive with one peripheral edge of a photograph of standard size. Magnetic tape wound within the cassette may have a width of about 0.050 inch (0.127 cm).

26 Claims, 9 Drawing Figures

INVENTOR.
CHRISTIAN C. PETERSEN

BY Brown and Mikulka
and
Gerald L. Smith
ATTORNEYS

INVENTOR.
CHRISTIAN C. PETERSEN

BY Brown and Mikulka
and
Gerald L. Smith
ATTORNEYS

INVENTOR.
CHRISTIAN C. PETERSEN

BY Brown and Mikulka
and
Gerald L. Smith
ATTORNEYS

TAPE RECORDING APPARATUS AND SYSTEM HAVING A VERY THIN CASSETTE

BACKGROUND

A practical approach to recording audio information contemporaneously with the taking of amateur or casual still photographs has been seen to be an illusive subject of study. To be practical, the audio-visual systems should be configured of components which are light in weight and of a small, compact dimension appropriate for transporting them in a convenient pocket of a garment. Magnetic recording systems are most practical for this purpose, assuming that the recording media can be inexpensively incorporated in permanent fashion with a photograph immediately following or coincidently with its exposure. Further, the magnetic recording member should have a cost well within a range commensurate with the costs involved in producing an amateur photograph. For instance, the cost should be such that the recording arrangement can be stored indefinitely with the photograph in a photographic album or the like. In view of the above criteria, efforts to derive a practical audio-visual recording system have shown preference for flat, disc-type recording systems, the audio recording material being adhesively affixed to a rearward portion of the photograph. Unfortunately however, adequate and inexpensive recording and playback systems suitable for use with such arrangements have been found to be impractical, proper control of magnetic transducer head tracking, and surface contact representing the paramount difficulties.

A use of tape-type magnetic recording systems for the instant purpose generally has been regarded as unfeasible in view of the complexity of the tape-retaining structures and of their inconvenient size. For instance, tape cassette systems have been considered impractical for permanent storage with a casual photograph, both from the standpoint of cost and from a standpoint of inconvenient bulk or size. Also contributing to the apparent difficulties of developing a practical tape system for the instant purpose are the many technical aspects attendant with the design of the tape system. Magnetic tape recording systems involve a process wherein a physical linear dimension of a magnetic recording medium is substituted for the time dimension of an original audio signal. If the final reproduced signal is to be an accurate representation of the original recorded signal, the motions of a length of tape across a transducer head surface during both recording and reproducing must be identical and, therefore, must be very accurately controlled. Without such control, errors in motion, classified as "timing" and "flutter" or "-wow," will be encountered.

A need for operator convenience in inserting magnetic tapes within recording and playback units led to the evolution of cassette or packaged tape structures. These structures, which for the present purpose are of relatively large size, incorporate designs reflecting many detailed considerations having to do with controlling the movement of a length of tape across a transducer head. For instance, tape movement is controlled for consistency through the use of capstan drive techniques. With these techniques, an accurately regulated roll system is utilized to produce supplementary grip upon the tape in the vicinity of the transducer head to insure that it is drawn across the head at predetermined control velocities. This subsidiary control over tape movement is necessary in view of the inertial and frictional characteristics inherent in the cassette tape spools and their drive and support systems.

Continuous contact of the magnetizable portion of the tape surface with the head unit during its movement thereacross is essential to acceptable performance, only a minor displacement of the tape from the head creating a signal loss. A canting of the incoming or egressing tape with respect to the plane of contact of the head unit so as to cause one edge or portion of the tape to rise from the head is considered a "zenith" error. This error generally is measured as the relative angular displacement of the plane of the tape from the plane of contact with the head. Proper orthogonal orientation of the tape and contact plane of the head is conventionally achieved, first, by careful design and manufacture of the height of the cassette unit. Designed having adequate height, the cassette structure may be fabricated under practically met tolerances while achieving adequately minimized angular deviation from perfect perpendicularity to the head contact surface. Second, the cassettes generally incorporate pressure pads which are arranged therein and configured for the purpose of urging the magnetic surface of the tape onto the head contact surface. The pads also function to retard the movement of dirt particles into the head area, a function desirable with relatively long tape systems. Where the pressure pads are formed within and serve as a component of a cassette structure, any zenith error present within the system will cause a pressure variation within the pressure pad across a cross section of the tape. Such variation will engender signal error. To overcome zenith error, the cassette and recorder systems often provide pressure pads which are coupled with the record-playback unit and are mechanically inserted within the cassette during an operational sequence. Basically, however, control over zenith error is achieved by providing an adequate cassette height so as to minimize a need for extremely close tolerances in the manufacture of the cassette structure.

Another critical aspect of the design of cassette structures and the like resides in the alignment of the reproducing head of a recording unit with the track on the tape. It is necessary that the gap formed within the sound reproducing magnetic head be exactly aligned with the track on the moving tape so that the gap is perfectly aligned with the signals as placed by the head during recording. This alignment, known as "azimuth" alignment, is most critical, an angular deviation from proper alignment of as much as fifteen minutes being unacceptable. Generally, azimuth alignment is maintained by assuring that cassette length is sufficient to permit fabrication with practical tolerances.

Modern tape cassette structures are fabricated under designs which incorporate various features accommodating the above-discussed requisites for achieving adequate performance. The structures necessarily are of such a complex nature as to be unavailable for the purposes now contemplated. For instance, their design is too bulky and their cost is too high for the indefinite storage and casual use required with an association with amateur still photography. In effect, a union of these tape cassette units with such photographic products appears to represent a highly illogical combination.

SUMMARY

The present invention is addressed to an audiovisual recording arrangement incorporating a highly practical combination of a magnetic tape cassette with a photographic or visual record. The size of the tape cassette of the invention is on such a miniaturized scale that, when combined with a photograph of conventional dimension, the tape unit remains remarkably unnoticeable. Practicality in the manufacture and resultant cost of the cassette units has been realized through a discovery that a significant number of the complex design considerations discussed above can be accommodated for through selective miniaturization of components. For instance, it has been determined that a magnetic tape having a width of about 0.050 inch (or 0.127 cm.) can adequately retain a two-track recordation of information. Combining this unusually thin tape within a cassette structure having a relatively short height, a need for exacting cassette structure tolerances not only remains unchanged over normally sized cassette structures, but may become advantageously reduced. Additionally, by configuring the cassette to have a length coextensive with the length of an edge of a visual record, such as a photograph, the tolerances required to maintain proper azimuth correction remain unchanged.

A further effect of the miniaturization of the cassette structure resides in the lowering of relative mass of the tape supporting system with respect to the driving mass of the recording-playback unit. While the latter unit remains somewhat uniform in size, the size and weight of the tape and its supporting units are greatly reduced. As a consequence, more relative power is available to control the movement of the tape across a head; and fewer control elements, such as pressure pads and the like, may be required.

In a preferred embodiment of the invention, an audiovisual assembly is provided incorporating a thin, flat supporting member which is configured in dimension for retaining upon its surface one or more rectangularly shaped photographic prints. Attached along one edge of this supporting member is the miniature tape cassette described above. The tape cassette is formed supporting a pair of spaced, tape-retaining spools which are freely rotatable therein. A strip of very narrow magnetic tape is wound between the small spools and across a centrally disposed access opening within a side of the cassette opposite that attached to the flat supporting member. A separate photograph may be adhesively attached to either side of the supporting member, and through the simple expedient of turning the assembly around in the recording-playback unit, audio information may be recorded upon a track of the tape corresponding to the appropriate one of the photographs.

Another feature and object of the invention is to provide an audio-visual assembly having a miniaturized tape cassette combined with a flat photograph-supporting surface which is configured and attached thereto so as to adhesively retain two photographs. The supporting surface is very thin, and the tape cassette housing is configured having a thickness corresponding with the combined thicknesses of the supporting member and two photographs.

The audio-visual recording member of the invention is simple to fabricate and is productable at low costs commensurate with the production of a casual or amateur photographic print. Further, the cost of the assembly is commensurate with a use involving the indeterminate storage of a casual photographic print.

Further objects and advantages of the present invention will become readily apparent as the following detailed description of the invention unfolds and when taken in conjunction with the drawings.

DETAILED DESCRIPTION

Figures 1, 2, 3:
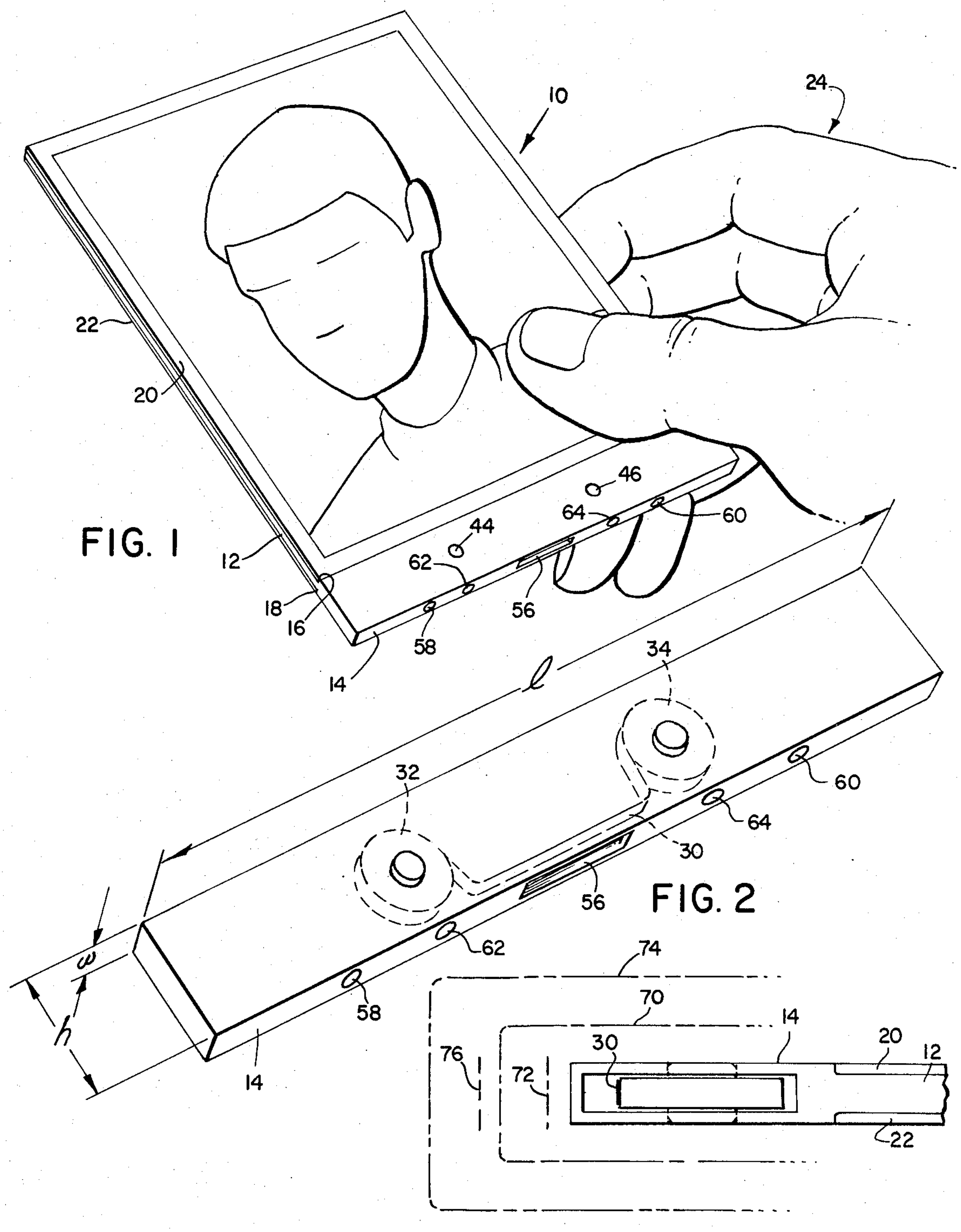
FIG. 1 is a pictorial representation of an audio-visual recording member according to the present invention, showing its relative size with respect to an adult hand.
FIG. 2 is a pictorial representation of the tape cassette portion of the audio-visual member of FIG. 1 and illustrating dimensional symbolism discussed later herein.
FIG. 3 is a diagrammatic representation of the tape cassette portion of the audio-visual recording member of FIG. 1, showing its relative size in comparison with commercially standardized tape cassette profiles.

Referring to FIG. 1 of the drawings, the unique configuration of the audio-visual recording assembly shown generally at 10 is revealed. Assembly 10 is formed of two basic components, a thin, flat photographic print supporting member 12 and a magnetic recording tape cassette 14. Tape cassette 14 is formed as a relatively long and thin rectangular parallelepiped. Its length is preferably coextensive with one edge of rectangular support member 12. Support member 12 is connected centrally along the top portion of tape cassette 14 and defines at the point of connection upper and lower ridges shown respectively at 16 and 18. The member 12 serves to support oppositely disposed photographic prints 20 and 22 and is dimensioned in correspondence with the prints. For convenience, the prints 20 and 22 may be adhesively affixed to the support member 12 and positioned thereupon such that one of their respective edge portions abuts an appropriate ridge 16 or 18. When the prints 20 and 22 are attached to the member 12, the assembly 10 represents a very thin and conveniently shaped audio-visual record which is small enough such that several may be carried in a shirt pocket. The size of a preferred embodiment of the arrangement is evidenced by the representation 24 of a human hand holding the assembly 10. Preferably, the upper and lower surfaces of the completed assembly 10 are somewhat uniform, the tape cassette 14 being configured having a thickness equivalent to about the combined thicknesses of the prints 20 and 22 and the support member 12. The dimensioning of the assembly is such that several "-blank" or unused units 10 may be carried in a convenient shirt pocket and, when carrying both audio and visual information, may be stored indefinitely, but with simple access, in a photographic album or the like.

To be commercially practical, the assembly 10 must be fabricable at a cost somewhat commensurate with that of producing one or two photographic prints, preferably those produced from photographic systems of a "self-developing" variety. For reasons set forth hereinabove, the conventional designs of tape cassettes are generally too detailed to meet such cost criteria while retaining acceptable audio fidelity performance. The present audio-visual system meets such cost and performance criteria as a consequence of the interrelationship of a series of heretofore unnoticed aspects of tape cassette operation. These aspects are discussed in the disclosure to follow.

Figure 4:
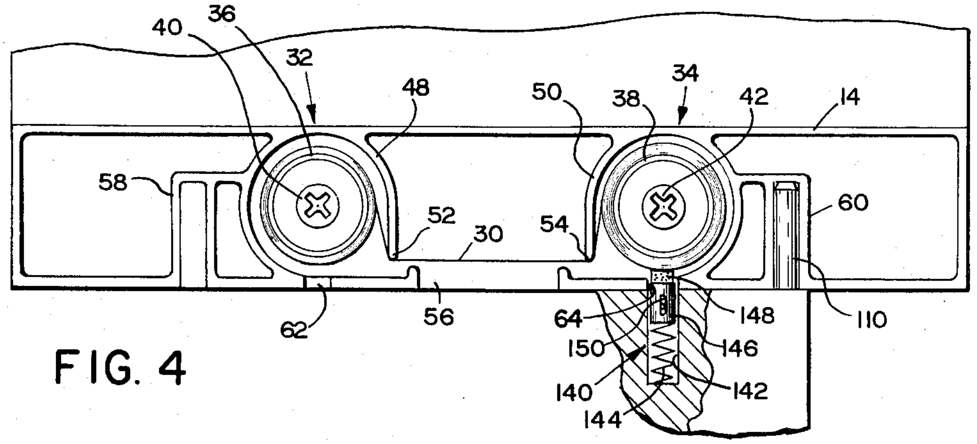
FIG. 4 is a plan view of a component forming a portion of the structure of the audio-visual member of FIG. 1, revealing the internal structure thereof.

Referring to FIGS. 2 and 4, the cassette 14 is shown to contain a quantity of magnetic tape 30. Tape 30 is selected having a very narrow width, preferably, about 0.050 inch across. It has been determined that such a width will carry two tracks of audio information, one for each of the two photographs or visual data sheets 20 and 22. Of particular importance, it has been ascertained that two parallel tracks of information readily can be recorded and replayed without interference or disturbance resulting from such factors as cross talk or edge effects. Tape 30 is wound between two reels shown generally at 32 and 34. Formed of plastic or the like, the reels 32 and 34, respectively, comprise annulus shaped hub portions 36 and 38, the inward peripheries of which are outwardly flanged to form cylindrically shaped hollow axle portions as are indicated, respectively, at 40 and 42. Axles 40 and 42 extend within corresponding holes or bushings shown, respectively at 44 and 46, which are formed in the front and rear faces of the cassette 14. The axles 40 and 42 additionally are configured having serrations within their inner periphery (FIG. 1). Thus freely rotatably mounted, the reels 36 and 38 are positioned within cavities formed by respective ridge members 48 and 50 within the cassette structure.

End portions 52 and 54 of respective ridge members 48 and 50 serve as guideposts for aligning tape 30 across a centrally located access opening 56 of the cassette. Opening 56 is dimensioned to receive the relatively narrow magnetic recording and playback head of a transducer system. It may be noted that the tape 30 is retained well within the structure of cassette 14 so as to isolate it from possible damage during handling. Additionally, tape 30 is wound between reels 32 and 34 in a manner wherein its magnetic surface is faced inwardly toward the axles of the reels. Spaced outwardly from reels 32 and 34 are vertically oriented recesses 58 and 60. Molded in similar fashion as ridge numbers 48 and 50, the recesses 58 and 60 serve to facilitate the manual mounting of the cassette 14 on a recording-playback unit. Formed in the lowermost portion of the cassette are brake access apertures or openings 62 and 64. These openings permit the insertion of a tension-regulating brake element during the operation of the cassette.

Cassette 14 as well as hub portions 36 and 38 of reels 32 and 34 are fashioned from a lightweight plastic. This plastic is selected of a material compatible with the plastic backing used for magnetic tape 30. The small and very light or low mass structure of the moving components of the cassette 14 are ideally suited to be accurately driven or rotated by a recording-playback unit which, even in a highly miniaturized form, represents a comparatively large mass drive system. Attention is also drawn to the relatively large diameter of the reel hubs 36 and 38. As a consequence of these relatively large diameters, the speed variation of driven tape 30 during winding and unwinding of the reels is held within desirable limits. Because of the very few parts incorporated in the cassette 14 and in view of the simplicity of their construction and assembly, cassettes 14 can be fabricated at costs well within the range contemplated in the earlier discussion.

Turning to FIG. 3, the size of cassette 14 and of tape 30 can be compared with the sizes of magnetic tape cassette structures standardized in international commerce. The profile of the smallest of the standardized cassette structures is shown by the broken line 70. Positioned in this profile is a line 72 showing the relative width, 0.150 inch (0.127 cm.), of the magnetic tape incorporated within such small cassette units. A more common standard dimension for these cassettes is shown by the broken line 74 superpositioned over cassette 14 and profile 70. Cassettes having the standard dimensions as shown at 74 also incorporate a magnetic tape having a width of 0.150 inch (0.127 cm.) as shown at 76. The cassette profiles indicated in the figure as at 14, 70, and 74 are presented in an enlarged scale for purposes of facilitating the comparison of their relative sizes.

Figures 5, 7, 8:
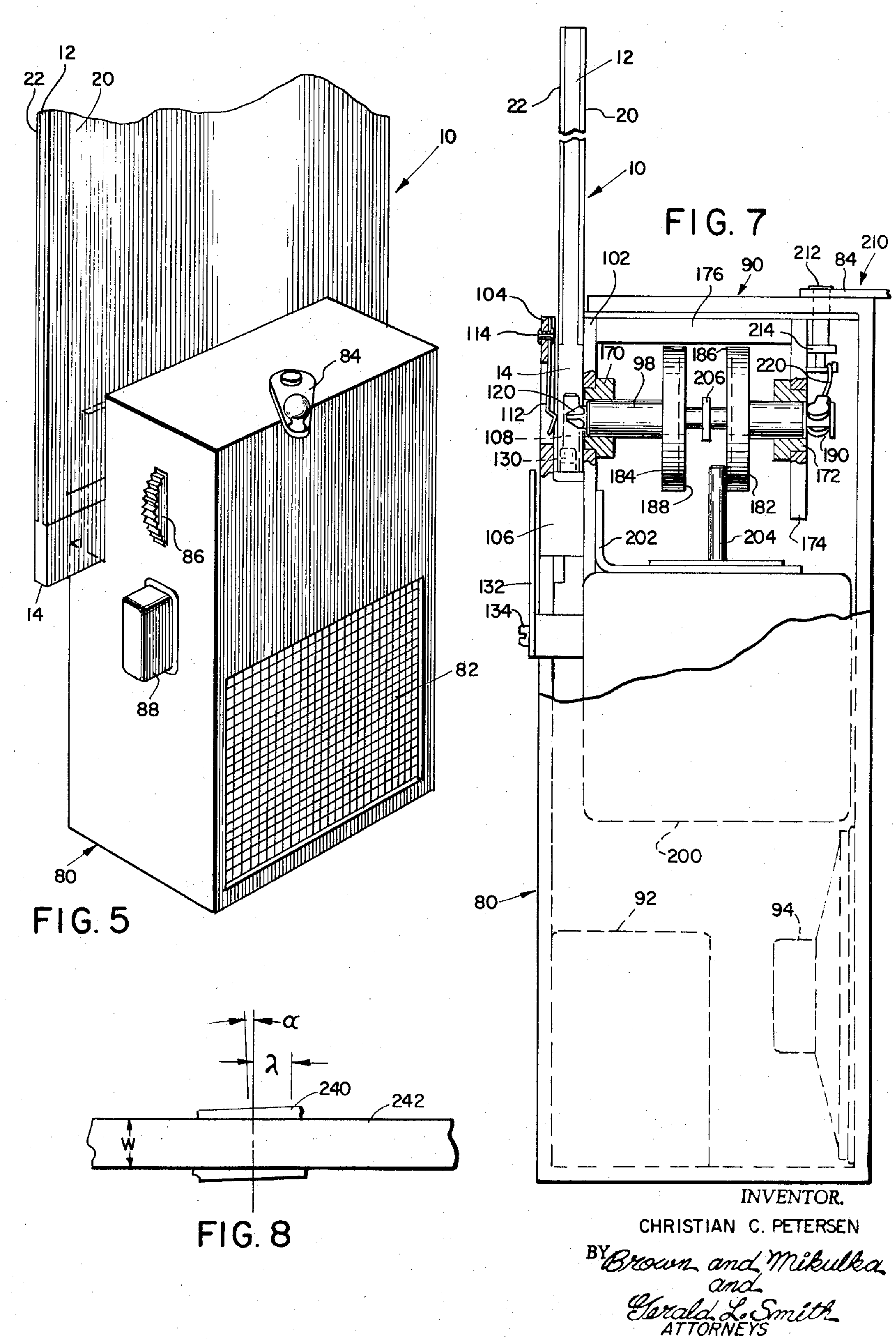
FIG. 5 is a pictorial representation of the audio-visual recording member of FIG. 1, showing it in operative association with a recording-playback unit.
FIG. 7 is a side view of the recording-playback unit and associated recording member of FIG. 5, with portions broken away to reveal internal structure.
FIG. 8 is a schematic representation of a magnetic tape and recording-playback head, showing symbolism describing their interrelated geometries.

Referring to FIG. 5, the assembly 10 is shown inserted within a magnetic recording and playback unit 80. Unit 80 is preferably of a small and compact size suitable for ease in carrying it along with a photographic camera. The unit is configured to receive cassette 14 of unit 10 by direct insertion and includes a speaker-microphone positioned behind a lattice facing element 82, a manually movable, forward-reverse element 84, a volume adjustment knob 86, and a manually operable button-type record-play mode selection switch 88. As may be evidenced from the drawing, either before or following the mounting of photographs 20 and 22 upon opposite sides of supporting member 12, assembly 10 is directly inserted within a receiving slot or the like formed within unit 80. Following such insertion, the operator appropriately adjusts lever 84 and knob 86 and actuates switch 88. Tape 30 within the cassette is then driven across a magnetic head while the operator speaks toward or into a microphone arrangement positioned behind lattice element 82. Assembly 10 is so oriented during this procedure that the operator may observe pictorial or other information upon it while he is speaking. Audio information for the oppositely disposed photograph as at 22 is recorded as a contiguous parallel track upon tape 30 by removing assembly 10 from unit 80 and reinserting it in reverse fashion. Such simplified reversal is available inasmuch as the cassette portion 14 is symmetrically designed about its centrally-disposed magnetic head access opening 56. With a reversed orientation of the assembly 10, the operator may observe visual information upon the photograph as at 22 while recording upon the second track.

Figure 6:
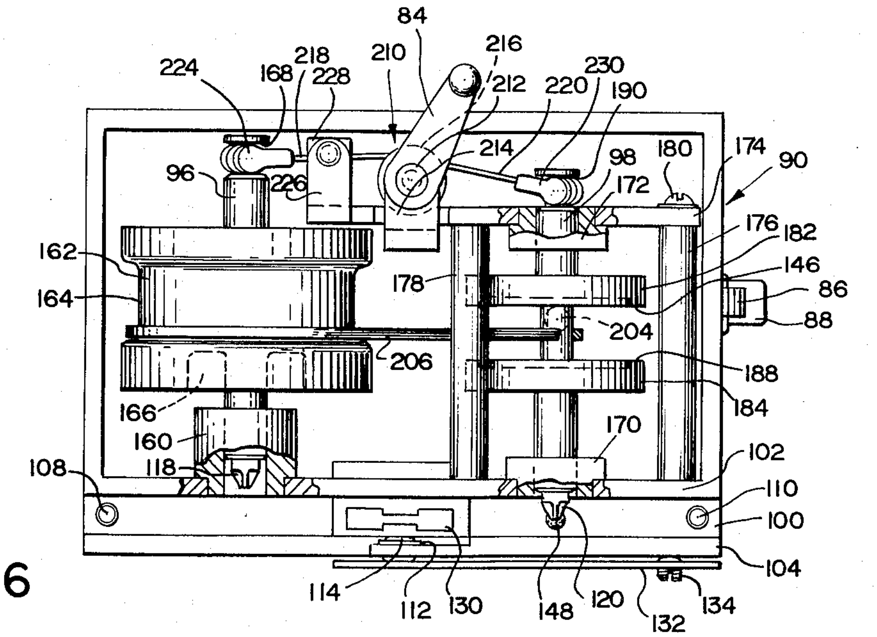
FIG. 6 is a top view of the recording-playback unit of FIG. 5 with portions broken away to reveal internal structure.

Referring to FIGS. 6 and 7, the internal arrangement of drive components of the unit 80 are revealed in detail. Basically, the unit 80 includes a drive system shown generally at 90, a battery power supply 92, recording and amplification circuitry (not shown) and a pM speaker-microphone 94. Looking in detail to the drive system 90, either of the reels 32 or 34 are driven from their central axes by engagement with either a record shaft 96 or a rewind shaft 98. Shafts 96 and 98 are so spaced and positioned within unit 80 as to be laterally movable into engagement with an appropriate hollow axle 40 or 42 of the respective reels 32 and 34. Cassette 14 is positioned within the unit 80 by direct insertion into a slot 100 positioned in the upper rear portion thereof. Slot 100 is formed by a wall 102 and bracket 104 attached thereto at its enlarged section 106. Extending upwardly from the bottom surface of slot 100 are alignment pins 108 and 110. Pins 108 and 110 are configured and spaced for insertion within an appropriate one of recesses 58 or 60, depending upon the orientation of assembly 10 within unit 80. When inserted within slot 100, the assembly 10 is secured against unnecessary movement by contact with a relief spring 112 attached to the back face of bracket 104 by a rivet 114. The foregoing arrangement for uniting the assembly 10 with recording unit 80 is simple and uninvolved. No dual motion on the part of the operator is required in order to properly position the cassette 14. When inserted in slot 100, the openings within appropriate axles 40 and 42 will be generally coaxially aligned with an appropriate shaft 96 or 98. Engagement of a select one of these shafts with either of reels 32 or 34 is effected by slidably moving the appropriate shaft toward the cassette 14. To provide proper engagement, the tips 118 and 120 of respective shafts 96 and 98 are formed having a conical, serrated shape. The conical shape of these tips provides for automatic centering of the engaged reel, while the serrated configuration is designed for driving, toothed engagement with corresponding teeth or serrations formed internally within the hub axles 40 and 42. The above noted self-centering arrangement permits reels 32 and 34 to be mounted within each cassette structure 14 under somewhat loose tolerances, thereby contributing to low-cost fabrication procedures.

Looking in more detail to the union of assembly 10 with recording-playback unit 80, centrally disposed between pins 108 and 110 at the bottom of slot 100, is a magnetic recording and playback head 130. Head 130 is configured having a thin thickness corresponding with the width of tape 30 such that it may be inserted through access opening 56 and into the hollow interior of cassette 14. The pole piece of the head is offset from the center line of the tape 30 such that two parallel spaced tracks may be recorded on the tape. Insertion of the head 130 well within the cavity of cassette 14 permits conforming of the tape 30 over the surface of the head 130. As a consequence, desirable contact pressures are provided between the oxide recording surface of the tape and the head 130. Additionally, this internal contact arrangement permits a disposition of the tape well within the structure of cassette 14 so as to isolate it from possible damage caused by handling. Head 130 is mounted within slot 100 through its connection with a mounting bracket shown at 132. Bracket 132 is firmly but pivotally mounted into unit 80 in the vicinity of head 130 and adjustably connected thereto by a set screw 134 spaced from the pivotal mounting. Set screw 134 is operative to provide an azimuth adjustment for the pole piece of head 130.

As an optional feature, recording-playback unit 80 may incorporate a simple brake assembly 140 within the bottom of slot 100. Turning momentarily to FIG 4, assembly 140 is configured within a cylindrical bore 142 extending downwardly within the enlarged section 106 of bracket 104. Within bore 142 there is positioned a helical spring 144, a hollow cylindrical piston 146, and a cylindrical brakeshoe member 148. Brakeshoe member 148 is supported by piston 146, the latter being biased outwardly from bore 142 by the spring 144. The freedom of movement of piston 146 is limited by a slot and pin arrangement 150 configured within its sidewall. The degree of this freedom is selected in correspondence with the radial variations of a tape retaining reel as at 32 as it is wound from a full to an empty status. Brakeshoe member 148 is dimensioned having a diameter permitting its simple insertion within openings 62 or 64 of cassette structure 14. Note that this insertion is direct in nature in keeping with the simple insertion heretofore described in connection with pins 108 and 110 and magnetic head 130. Brake 140 is always associated with the supply reel and, if necessary, causes an increase in the tension upon tape 130 between the reels so as to correspondingly increase the pressure of the recording surface of the tape against the surface of magnetic head 130. The use of such a brake arrangement as at 140 eliminates any need for pressure pads or the like within the cassette structure 14. Eliminating such need considerably lessens the cost of fabrication of such cassettes.

Returning to FIGS. 6 and 7, record shaft 96 of drive system 90 is rotatably mounted within unit 80 through its engagement with a support bushing 160. Formed of a relatively friction-free material such as teflon or the like, bushing 160 is fixed to a sidewall of unit 80 and rotatably supports shaft 96 in cantilever fashion. Thus supported, shaft 96 may be moved through the bushing 160 and into engagement with an appropriate cassette reel 32 or 34. Rotational movement is imparted to the shaft 96 from a drive pulley 162 fixed centrally thereupon. Pulley 162 is configured having a driving trough of relatively wide surface as indicated at 164. Additionally, the forward surface of the pulley 162 is recessed at 166 to permit its slidable movement over the protruding bushing 160 when the shaft 96 is urged into an extended or forward driving orientation.

A rearward end of record shaft 96 is turned to provide a groove 168 of lesser diameter. Groove 168 will be seen to cooperate with an arrangement for moving the shaft 96 into and out of engagement with an appropriate reel 32 or 34 of cassette 14.

Rewind shaft 98 is supported upon one side of unit 80 by a bushing 170. Formed of an appropriately self-lubricating material such as teflon or the like, bushing 170 is fixed to wall 102 of unit 80 and is arranged to permit shaft 98 to both rotate and slide into engagement with an appropriate reel 32 or 34 of cassette 14. The opposite end of rewind shaft 98 is rotatably and slidably supported by a second bushing 172. Similar to bushing 170, bushing 172 may be fashioned of a self-lubricating material such as teflon and is configured to permit rotation and axial sliding of the shaft 98. Bushing 172 is fixed to a supporting plate 174 oriented in parallel with wall 102. Plate 174 is supported by standoff columns 176 and 178. Each of the columns 176 and 178 is fixed to wall 102 of unit 80 and extends in cantilever fashion therefrom. Connection with plate 174 is made by bolts as at 180.

Rewind shaft 98 is selectively driven from either of two drive members 182 and 184. Each of the angularly shaped drive members 182 and 184 is formed having a contact ridge as is indicated respectively at 186 and 188. Facing toward the central portion of shaft 98, ridges 186 and 188 are formed in the outer periphery of their respective drive members 182 and 184. The portions of the drive members forming ridges 186 and 188 preferably are formed of a hard rubber material. Similar to record shaft 96, one end of rewind shaft 98 is turned to form a groove 190 of reduced diameter.

Rotation is imparted to rewind shaft 98 through a select one of the aforedescribed driving members 182 or 184 from a motor 200 located within unit 80 and under shaft 98. Powered from batteries as at 92, electric motor 200 is supported vertically by a bracket 202 such that its rotating drive shaft 204 extends upwardly and in contactable relationship with the peripheral contact ridges 186 and 188 of respective members 182 and 184. It will be apparent that the use of hard rubber for these ridges permits their non-slipping engagement with shaft 204. With the drive arrangement thus described, when the rewind shaft 98 is in its retracted position, contact ridge 188 of drive member 184 will frictionally engage shaft 204 of motor 200. Energization of motor 200 will cause the rotation of shaft 204 and the consequent rotation at predetermined speed of drive member 184 and shaft 98. Shaft 98 is coupled to pulley 162 via a dimensionally stable endless belt 206. When driven by shaft 98, belt 206 will cause rotation of pulley 162 and shaft 96 in a direction appropriate for driving a take-up reel at predetermined rotational speed.

When shaft 98 is extended forwardly for engagement with a reel 32 or 34, shaft 204 of motor 200 will engage the contact ridge 186 of drive member 182. As a consequence, shaft 98 will be driven at a predetermined rotational speed in an opposite direction appropriate for a rewind function.

Movement of shafts 96 and 98 into and out of operational positions is accomplished by the manual manipulation of lever 84 at the top of unit 80. Lever 84, in turn, is coupled with a yoke assembly indicated generally at 210. Assembly 210 includes a cylindrical shaft 212 fixed to an rotatable with lever 84. Shaft 212 is pivotally mounted within a support bracket 214 fixed, in turn, to plate 174. The lowermost portion of shaft 212 is configured to fixedly retain a torque spring 216. Torque spring 216 is wound about shaft 212 and is configured having two arm portions 218 and 220 extending outwardly therefrom.

Arm portion 218 terminates in a Y-shaped bushing or harness 224, the slot portion within which is dimensioned to slidably engage the reduced diameter shaft portion of groove 168. The stems of bushing 224 forming the gripping slot are of rounded configuration to permit a pivotal action during the inward or outward movement thereof. It may be apparent from the foregoing that movement of lever 84 in a counterclockwise direction as viewed from the top of unit 80 will cause arm portion 218 to urge shaft 96 toward engagement with a cassette 14 within slot 100. Conversely, clockwise movement of lever 84 will withdraw shaft 96 to a retracted position. The latter position is limited by the presence of an L-shaped bracket assembly 226. Bracket 226 is formed having a downwardly protruding extension 228 which will contact the torque spring arm portion 218 when the latter is in its retracted orientation.

Arm portion 220 terminates in a similar Y-shaped bushing or harness 230. The outer extensions of bushing 230 are formed having a slot dimensioned to slidably engage the reduced diameter portion of shaft 98 present at groove 190. With the arrangement as shown, a manual movement of lever 84 in a clockwise direction, as viewed in FIG. 6, will cause rewind shaft 98 to move from a retracted position to a position engaging a select one of cassette 14 reels 32 or 34. Such movement of the shaft 98 also causes peripheral contact ridge 186 of drive member 182 to engage motor drive shaft 204 to provide a rewind rotation of the shaft.

When lever 84 is oriented for operating in a record or playback mode, it is moved counter-clockwise as above described so as to cause shaft 96 to move forwardly within bushing 160 an extent necessary for causing the engagement of its tip 118 with an appropriate reel axle 40 or 42 of a cassette 14. As this maneuver takes place, arm portion 220 of the yoke drive 210 simultaneously pulls rewind shaft 98 to a retracted position. During the simultaneous movement of shafts 96 and 98, endless belt 206 will automatically readjust to the altered orientations by "traveling" both along driving trough or surface 164 and that portion of shaft 98 extending between drive members 182 and 184. As shaft 96 reaches its reel-engaging position, peripheral contact ridge 188 of drive member 184 will have made contact with drive shaft 204 of motor 200. The latter contact will provide rotational drive through endless belt 206 to the pulley 162.

Intermediate the two operative positions discussed above, lever 84 provides a "neutral" setting in which neither shaft 96 nor shaft 98 is in a forward position engaging a reel 32 or 34 of cassette 14.

Electrical switching, not shown, may be coupled with the yoke assembly 210 for purposes of energizing electric motor 200 somewhat simultaneously with the movement of either of shafts 96 or 98 into a cassette-engaging orientation. Additionally, such switching may function to de-energize motor 200 when the yoke assembly 210 positions these shafts 96 and 98 in a neutral or non-engaging position.

Earlier in the present disclosure several design factors considered critical to deriving quality performance from tape systems were discussed. Particularly important among these considerations was that of providing proper azimuth alignment of a length of magnetic tape with respect to the orientation of the gap of a magnetic head. Should the reproducing head be misaligned from proper azimuth orientation, the resultant signal will be reduced by the equation:

$$\text{Alignment loss} = 30 \log \left[ \frac{\text{Sin}\,\frac{\pi W \tan \alpha}{\lambda}}{\frac{\pi W \tan \alpha}{\lambda}} \right] db$$

where W = width of recorded track; $\alpha$ = angle of misalignment; and $\lambda$ = wavelength of recorded signal. These symbols along with an illustration of azimuth misalignment are portrayed in connection with FIG. 8. In that figure, the pole of magnetic head is represented at 240 and a symbolic length of magnetic tape is shown at 242. To assure that a tape cassette is properly aligned within a recording-playback unit, the cassette is configured having a length of an extent sufficient to minimize any angular deviations in the vicinity of the tape's contact with a magnetic head. Such lengthwise dimensions also permit fabrication of the cassette units under easily met manufacturing tolerances. While being very miniature in size, the present cassette arrangement retains a length adequate for it to be manufactured under the same tolerances. As may be evidenced from the following tabulation, the length of the present cassette structure when compared with that of standardized cassettes represents little or no deviation from current practice. In the tabulation, the presently standardized sizes are identified under the headings "Cassette" and "Mini-Cassette," while the present cassette arrangement is identified under the heading "Subject Cassette." Referring additionally to FIG. 2, the letter symbols used within the tabulation are identified. For instance, "*l*," "*h*" and "*w*" are shown to represent respectively length, height and width of the cassette, while the symbol "*t*" represents tape width.

| | Cassette | | Mini-Cassette | | Subject Cassette | |
|---|---|---|---|---|---|---|
| | (inches | (cm. approx.) | (inches) | (cm. approx.) | (inches) | (cm. approx.) |
| *l* | 4.0 | | 2.2 | 5.58 | 2.0 to 4.25 | 5.08 to 10.80 |
| *h* | 2.5 | 6.35 | 1.3 | 3.3 | 0.550 | 1.39 |
| *t* | 0.150 | 0.381 | 0.150 | 0.381 | 0.050 | 0.127 |
| *w* | 0.480 | 1.22 | 0.280 | 0.712 | 0.120 | 0.305 |
| *h/t* | 16.67 | | 8.67 | | 11.0 | |
| *l/h* | 1.6 | | 1.69 | | 3.64 to 8.5 | |

From the tabulation it may be seen that the length of the cassette of the present invention corresponds with the length of conventional magnetic tape cassettes. This dimension also ideally conforms to the shape of a standard photographic print of the self-developing variety. When connected along an edge of the photograph as shown in FIG. 1, the cassette portion 14 of the film unit does not detract from the photograph and is conveniently handled in combination with the information record. The length "*l*," however, serves the important function of maintaining proper azimuth orientation for recording and playback purposes.

Figure 9:
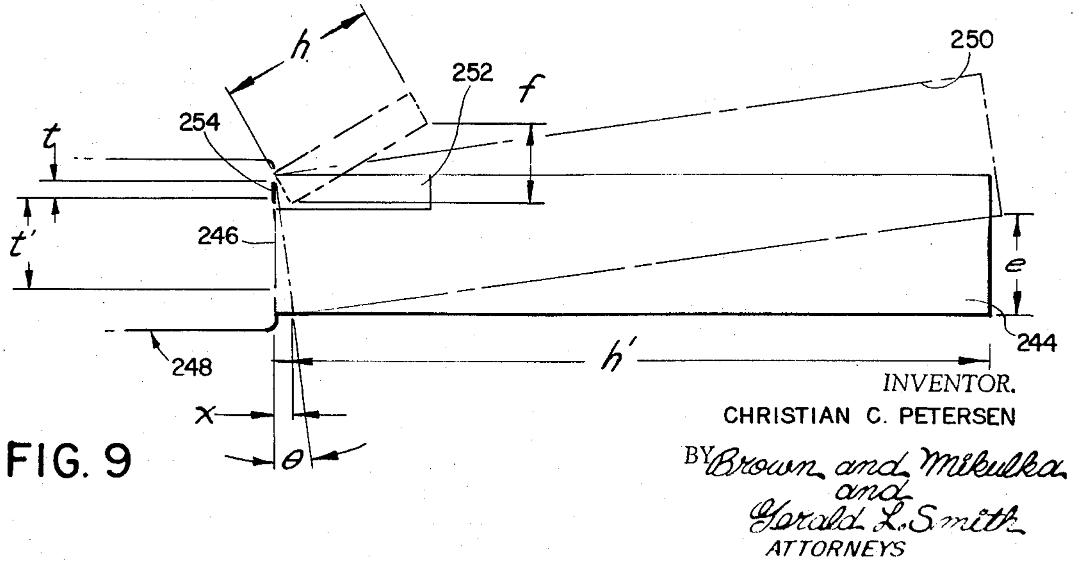
FIG. 9 is a schematic representation of a tape cassette according to the present invention, as well as a standard commercial cassette, illustrating their respective tape width to cassette height relationships.

Referring additionally to FIG. 9, a greatly exaggerated representation of zenith alignment error is portrayed. Zenith error concerns the problem of avoiding displacement of a portion of the magnetizable tape surface from the head unit during its movement thereacross. Only a minor displacement of the tape from the head will create a serious signal loss. Assuming that a zenith error stems from a dimensional error along a surface of a cassette represented by a height "*h*" or within a supporting platform or the like for that surface, one edge of a magnetic tape may be urged to lift from the surface of a magnetic head by a minute distance. Such a situation is represented in exaggerated form in FIG 9 in which a conventional, schematically portrayed cassette as at 244 having a height *H'* and a tape 246 having a width indicated at *T'* is aligned before the surface of a magnetic head shown schematically at 248. Should the cassette 244 be displaced at its outermost tip by a distance represented by "*e*," it will assume the orientation shown in phantom at 250. As a consequence, the tape 246 will be rotated about an angle $\theta$ and will be displaced by a maximum distance from the head surface indicated as "*x*." For illustrative purposes, it may be assumed that the distance "*x*" represents a maximum allowable displacement of the tape from the surface of head 248. Superimposed upon the drawing of cassette 244 is the schematic outline 252 of the very miniature cassette according to the present invention. This cassette 252 is shown having a magnetic tape 254 of width "*t*," about ⅓ of the width of tape 246. Cassette 252 is shown having a height "*h*." For the tape 254 of cassette 252 to assume a maximum displacement from the surface of magnetic head 248 equivalent to distance "*x*," the cassette must be displaced at its outer tip by a distance indicated as "*f*." Note that the distance "*f*" is comparatively large. This schematic representation of the capability of the cassette of the invention to readily maintain acceptable alignment even though greatly miniaturized is further evidenced in the above tabulation. Referring to that tabulation, it may be noted that the ratio of height "*h*" to tape width "*t*" remains at values commensurate with those provided by conventional cassettes. A further advantage in providing adequate zenith alignment stems from the relative ease of a tape of lesser width to conform over a magnetic head during operation.

A further desirable characteristic of the cassette arrangement of the invention resides in the relative mass of the tape-retaining elements of the system. As noted earlier, reels 32 and 34 are formed of a lightweight material such as plastic. As a consequence, during feedout or winding they fail to develop such inertias as may tend to cause undesirable looping or the like. Further, because of the great disparity in the relative mass of the tape-retaining components with respect to the driving system, even though the latter is a convenient portable size, desirably consistent tape speeds are available.

Since certain changes may be made in the above system and apparatus without departing from the scope of the invention herein involved, it is intended that all matter contained in the above description or shown in the accompanying drawing shall be interpreted as illustrative and not in a limiting sense.

What is claimed is:

1. An audio-visual recording and reproducing system comprising:

a tape cassette including a thin elongate spool housing formed having spaced parallel side surfaces, tape-retaining spools mounted rotatably within said housing between said side surfaces, a strip of narrow magnetic tape windably affixed to and extending between said spools, an access opening formed within one elongate edge of said spool housing between said side surfaces for exposing a portion of said tape, and means defining a thin, flat support member attached to an elongate edge of said spool housing oppositely disposed from said edge having said access opening and extending therefrom in parallel relationship with said side surfaces for supporting at least one flat visual record member having rectangularly arranged edges, said support member and said record member defining a flat composite assembly of given thickness when joined, said parallel side surfaces being spaced a distance apart corresponding with said given thickness establishing substantial co-planar conformity with the surfaces of said composite assembly; and an audio mechanism having a recessed opening for receiving said spool housing by direct insertion and including drive means engageable with said spools when said housing is inserted for causing said tape to be moved between said spools and drawn across said access opening, and transducer means including a magnetic head portion contactable with said tape at said access opening for providing audio information exchange with said tape.

2. The audio-visual recording and reproducing system of claim 1 wherein the width of said magnet tape is selected as about 0.050 inch.

3. The audio-visual recording and reproducing system of claim 1 including retarding means associated only with one of said spools for causing said tape to be tensioned around said magnetic head portion.

4. The audiovisual recording and reproducing system of claim 1 wherein said flat support member means is formed integrally with at least a portion of said elongate spool housing.

5. The audio-visual recording and reproducing system of claim 1 in which said spool housing is configured as a rectangular parallelepiped having a thickness equivalent to about the combined thickness of said support member and two of said record members.

6. The audio-visual recording and reproducing system of claim 1 in which said spool housing is configured as a rectangular parallelepiped having a lengthwise dimension corresponding with a select edge dimension of said record member.

7. The audio-visual recording and reproducing system of claim 1 in which said spool housing is configured as a rectangular parallelepiped; and said supporting member is connected thereto at the center of said oppositely disposed elongate edge.

8. The audio-visual recording and reproducing system of claim 1 in which said supporting member surface is configured as a rectangle having dimensions corresponding with those of said record member.

9. The audio-visual recording and reproducing system of claim 1 wherein said supporting member is configured for adhesively retaining said record member.

10. The audio-visual recording and reproducing system of claim 1 in which said tape cassette spool housing is formed having a rectangular parallelepiped configuration, the lengthwise dimension of which is selected for minimizing the tolerance requirement necessary to achieve minimal azimuth error when inserted within said audio mechanism.

11. The audio-visual recording and reproducing system of claim 10 in which said tape cassette spool housing is configured having a length, $l$, and a height, $h$, and said length, $l$, and height, $h$, are selected to establish a ratio, $l/h$, having a value greater than or about 3.64.

12. The audio-visual recording and reproducing system of claim 1 in which said supporting member is configured for retaining two oppositely disposed photographic prints; and said magnetic tape is dimensioned for retaining only two recording tracks.

13. The audio-visual recording and reproducing system of claim 12 in which said access opening is positioned about midway between said pair of spools.

14. The audiovisual recording and reproducing system of claim 1 in which said spool housing is configured as a rectangular parallelepiped having a selected height, $h$; said tape is elected having a width, $t$, and wherein the ratio of $h/t$ is selected as about 11.0 or greater.

15. The audio-visual recording and reproducing system of claim 14 wherein the said width, $t$, of said magnetic tape is selected as about 0.050 inch.

16. A magnetic tape cassette assembly for use with a visual data sheet arrangement of finite thickness comprising in combination:

a cassette housing generally formed as an elongate rectangular parallelepiped having parallel side surfaces of length, $l$, mutually spaced to define a width, $w$, and having a height, $h$;

a length of magnetic tape having a width, $t$;

a pair of spools spaced along said length and rotatably mounted within said housing for windably retaining said length of magnetic tape;

means defining an access opening within one side of said housing defining said width, $w$, and intermediate said spools for permitting an operational union between a surface of said tape and a magnetic recording head;

said length, $l$, being selected with respect to said height, $h$, to establish a ratio $l/h$ having a value treater than or about 3.64; and means defining a supporting surface extending from a side of said housing defining said width, $w$, opposite said one side for engaging and supporting said data sheet such that said sheet extends from said side opposite said one side in a plane substantially parallel to said parallel side surfaces to define a substantially flat composite assembly.

17. The magnetic tape cassette assembly of claim 16 in which said width, *t*, of said magnetic tape is about 0.050 inch.

18. A magnetic tape cassette assembly of claim 16 in which said cassette housing is formed having a said width, *w*, of about 0.120 inch.

19. The magnetic tape cassette assembly of claim 16 wherein said height, *h*, and said width of tape, *t*, are selected to establish a ratio, *h/t*, having a value greater than or about 11.0.

20. The magnetic tape cassette assembly of claim 16 in which said ratio, *l/h* is selected having a value of about 8.5.

21. The magnetic tape cassette assembly of claim 16 in which said spaced spools are freely rotatable and symmetrically disposed about said access opening.

22. The magnetic tape cassette assembly of claim 16 wherein said height, *h*, is selected with respect to said width of tape, *t*, to establish a ratio *h/t* having a value greater than or about 11.0.

23. The magnetic tape cassette assembly of claim 16 wherein said supporting surface is molded integrally with at least a portion of said cassette housing.

24. The magnetic tape cassette assembly of claim 16 in which said cassette housing is configured for attachment with said visual data sheet arrangement along a peripheral edge thereof.

25. The magnetic tape cassette assembly of claim 24 in which said cassette housing is configured having a length, *l*, substantially co-extensive with said data sheet peripheral edge.

26. The magnetic tape cassette assembly of claim 25 in which said supporting surface is configured to adhesively engage said data sheet.

* * * * *